Figure 1:
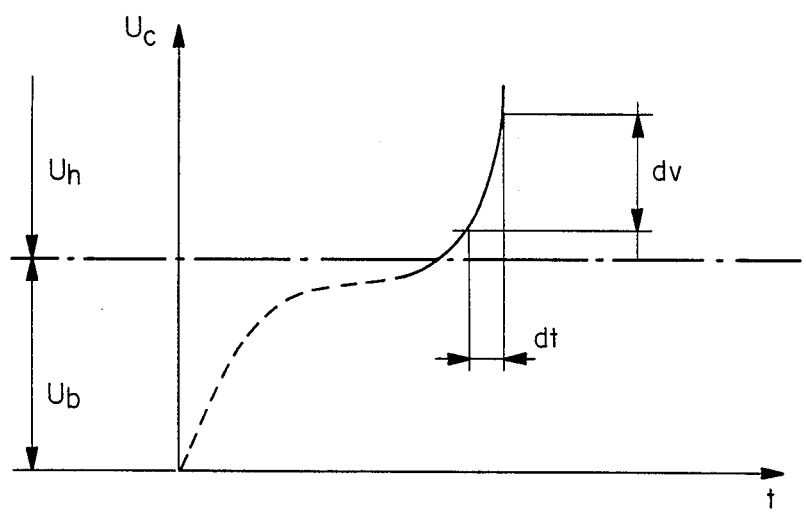

United States Patent [19]

Lefort et al.

[11] Patent Number: 4,752,854
[45] Date of Patent: Jun. 21, 1988

[54] METHOD AND APPARATUS FOR PROTECTION AGAINST LIGHTNING

[75] Inventors: Louis Lefort; Pascal Boilloz; Monique Lefort, all of Douai; Bernard Lambin, Le Madeleine, all of France

[73] Assignee: Indelec Sarl, Douai, France

[21] Appl. No.: 934,821

[22] Filed: Nov. 25, 1986

[30] Foreign Application Priority Data

Nov. 26, 1985 [FR] France ............................. 85 17813

[51] Int. Cl.⁴ .............................................. H02H 9/02
[52] U.S. Cl. ........................................ 361/117; 174/3; 174/4 R; 361/222; 361/231
[58] Field of Search ............... 361/117, 129, 130, 220, 361/222, 230, 231; 174/3, 2, 4 R; 313/325, 231.11, 155

[56] References Cited

U.S. PATENT DOCUMENTS 4,480,146 10/1984 Invernizzi ............................ 174/3
4,565,900 1/1986 Arnau ................................... 174/3

FOREIGN PATENT DOCUMENTS 0060756 9/1982 European Pat. off. .
0096655 12/1983 European Pat. Off. .
0139575 5/1985 European Pat. Off. ................ 174/2
907037 2/1946 France .
1478526 4/1967 France .
2543370 9/1984 France .

Primary Examiner—A. D. Pellinen
Assistant Examiner—Todd E. DeBoer
Attorney, Agent, or Firm—Kerkam, Stowell, Kondracki & Clarke

[57] ABSTRACT

A method and apparatus is provided for protecting against lightning. An atmospheric potential tapping member is disposed for this purpose in the atmospheric field prone to lightning to collect a voltage ($U_c$) which, before there is a real threat of the lightning striking, has a value which remains within a lower voltage range ($U_b$) a capacitor is progressively charged with the voltage $U_c$ and a few tens of microseconds before there is a real threat of the lightning striking a given place, the atmospheric field will undergo a sudden increase and will therefore influence, relatively in the same way, the voltage collected which will rise up to and into a range ($U_h$) of voltages greater than that ($U_b$) where it was situated up to then. This potential gradient is detected with respect to time, and the evolution of the potential gradient (dv/dt) detected with respect to time is monitored in this upper range ($U_h$) of voltages.

When the potential gradient detected with respect to time rises beyond a predetermined threshold, the capacitor is caused to discharge into a discharge circuit.

16 Claims, 3 Drawing Sheets

METHOD AND APPARATUS FOR PROTECTION AGAINST LIGHTNING

The invention relates to a method of protection against lightning.

It also relates to the means for putting this method into practice and to the material for protection against lightning provided with these means, such as installations which, in thundery weather, provide preventive load-shedding of important installations and it relates of course more particularly but not exclusively to lightning conductors.

Although, in fine weather, the electric field on the ground is of the order of a hundred volts per meter, on the approach of a thundery cloud this field undergoes a phase modification: it is generally reversed then increases in enormous proportions.

At that time, for a flat ground, the field may reach more than ten thousand volts per meter, the potential difference between the base of the cloud and the ground being then several tens of millions of volts.

Despite this enormous potential difference and the beginning of ionization of the air which occurs from place to place, of the release of electric charges, the main discharge cannot always be initiated spontaneously through the immense air layer which still forms a good insulator; there is then not yet any real threat of the lightning striking.

The main discharge corresponding to lightning striking cannot be initiated as long as the atmospheric field does not undergo a new modification phase in which it will be subjected to a sudden increase which will make it capable of initiating the so called "corona" effect, that is to say forming small intensity discharges, called "traces" or "precursers", capable of creating a conducting channel formed of partiallyionized air between the clouds and the ground.

It is further known that the least roughness on the ground acts as field concentrator which, depending on its more or less upwardly elongated shape, may multiply the value of the field several hundreds of times and anticipate thereabout the emission of electric charges.

Thus an ambient field of the order of ten thousand volts per meter may already, because of this so called "tip effect" concentration, be brought, about the roughness, to a sufficient value for initiating the corona effect, that is to say to cause at the tip of the roughness an intense emission of still unsharp sparks which are manifested in the form of glow discharges or aigrettes.

With the height of the tip and especially with the increase in the atmospheric field, these aigrettes are amplified and become veritable sparks.

It is they which, when rising, each leaves behind it a conducting channel formed of partially ionized air forming the rising "tracer" or "precurser" which, by rising by successive leaps at a speed of the order of 20 km per second, may reach the cloud or one of the down coming "tracers" or "precursers" coming therefrom and thus terminate the conducting channel through which the main discharge may then flow.

It is of course this tip effect which is used in lightning conductors which, in their simplest version consist of a conducting tip situated at a certain height from the ground; it is connected to ground by a so called "lightning conductor down feed".

But although such a so called "inert" tip proves efficient in certain cases, numerous other cases may also be found where the lightning, especially when it is of low intensity, strikes in the immediate vicinity of this tip because of the presence of other irregulaties such as a bell tower, a mast, etc, which have produced the same effect more rapidly than it.

This is why, for a long time, means have been used in combination with the conventional tip so that electric charges are emitted at the tip of the lightning conductor, before the neighboring inert irregularities, so as to initiate the corona effect and so form rising "tracers" and to form channels formed of partially ionized air which will reach the cloud or a downcoming "precurser" and this as high as possible in the sky so as to widen the zone thus placed under the protection of the tip.

Among these known means, some act through at least one electrode, whereas others act directly on the tip of the lightning conductor.

With the means up to now acting through at least one electrode, this electrode is disposed at a small distance from the tip connected to the ground and it is fed so that an electric discharge is established between the electrode and the tip and causes a complementary emission of electric charges, of electrons, which is thus added to the emission from the tip taken individually and which, like it, will produce the ionization by impact of the air present about the tip.

With the known means (EP-A-No. 96655), the power supply is provided in thundery weather by means of a member picking up the atmospheric potential which, as soon as the air is at least weakly ionized, collects a voltage with which the electrode is directly supplied so that, under the effect of the potential difference between the electrode and the tip connected to ground, the discharge is established.

Unfortunately, even though this principle of potential tapping is good, the amount of energy available is very small and in addition the complementary emission can only take place with a delay of the order of a few tens of microseconds, with respect to the moment when the atmospheric field has reached the value sufficient for initiating the corona effect from pointed irregularities.

Since direct supply of tne electrode by an atmospheric potential tapping member cannot then be sufficient, means are known, either combined with this atmospheric potential tapping or are totally independent of such a potential tap.

The means known up to now and combined with this potential tap consists of radioactive charges (FR-A-No. 14 78 526-FIG. 1) whose alpha rays reinforce the ionization of the air in the zone of the potential tapping member and so the efficiency of this member.

Although the efficiency of these radioactive charges has been demonstrated, use thereof can however no longer be envisaged considering the legal or statutory prohibitions decreed in most countries against the use of radio-elements and this, particularly for the manufacture of lightning conductors (Official Journal of the French Republic of the 20 Oct. 1983-decree of the 11 Oct. 1983).

The means independent of the atmospheric potential tap obviously require the use of another source of energy, either independent of or dependent on the lightning conductor.

The independent source consists of a power supply battery or of a high voltage generator which, failing maintenance operations makes the lightning conductor rapidly inefficient.

The source dependent on the lightning conductor consists for example of a piezoelectric device on which a mechanical pressure is exerted by the force of the wind (Fr-A-No. 2 543 370), but the appearance of this wind on the approach of the thunderstorm is uncertain and makes the lightning conductor unreliable.

So that the tip of the lightning conductor emits electric charges more rapidly, in addition to the above mentioned means acting on at least one electrode, other means are known acting directly on the tip of the lightning conductor.

Some of these other known means simply use radioactive charges which, about the tip of the lightning conductor, promote ionization of the ambient air (FR-A-No. 1 478 526, FIG. 2) or of a pulsed gas (FR-A-No. 2 285 008) but, like the electrode lightning conductors using it, come under the same prohibition.

Other means use an external source, such as a battery or a high voltage generator (FR-A-No. 9, 070 37 and EP-A-No. 60756), to the terminals of which the tip on the one hand and the earth on the other are connected, whereas the tip, supplied from the external source, is isolated from the downfeed of the lightning conductor by a dielectric opposing the passage of the high voltage discharges coming from the source but of course letting through the main discharges of the thunderstorm.

Unfortunately, since they require an external electric power supply source, as was seen above, these means involve numerous maintenance operations, which cannot be readily accepted from the financial point of view.

One result that the invention aims at obtaining is a method for protecting against lightning which, independently and so without using an external source of energy nor radioactive elements, acts reliably just at the time when there will be the danger of a main discharge in the protected zone.

In the application to lightning conductors, one result of the invention is to supply the energy required for initiation of the corona effect, by anticipation.

To this end, it provides a method of the above mentioned type characterized more especially in that, in thundery weather:

1. Knowing that even before there is a real threat of the lightning striking, the atmospheric field becomes sufficient for there to be in certain zones release of electric charges which by impact will ionize the air, by means of an atmospheric potential tapping member which is preferably placed in a zone where ionization of the air is promoted, a voltage is collected which, before there is a real threat of the lightning striking, has a value which remains in a so called lower range of voltages.

2. With the voltage thus collected, at least one capacitor is progressively charged.

3. Knowing moreover that a few tens of microseconds before there is a real threat of lightning striking at a given place the atmospheric field at this position will undergo a sudden increase and will thus influence the voltage collected, relatively in the same way, which will rise to a range of voltages higher than that where it was situated up to then and this with a very considerable potential gradient detected with respect to time, the evolution of the potential gradient detected with respect to time is monitored in this upper range of voltages.

4. As soon as the potential gradient detected with respect to time rises beyond a predetermined threshold, the capacity of the capacitor is controlled to discharge into the circuit supplying with power the equipment for protection against lightning.

It also relates to the means for implementing this method and the lightning protection equipment comprising such means.

Figure 2:
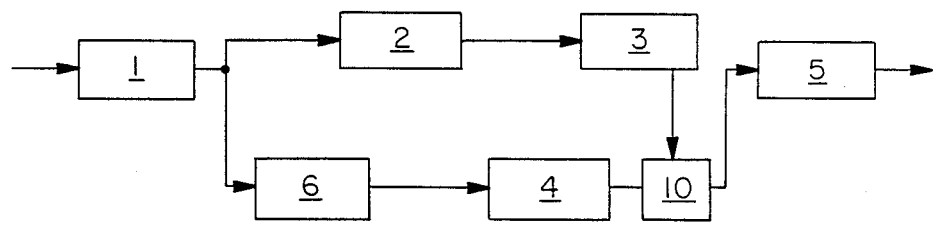
Figure 3:
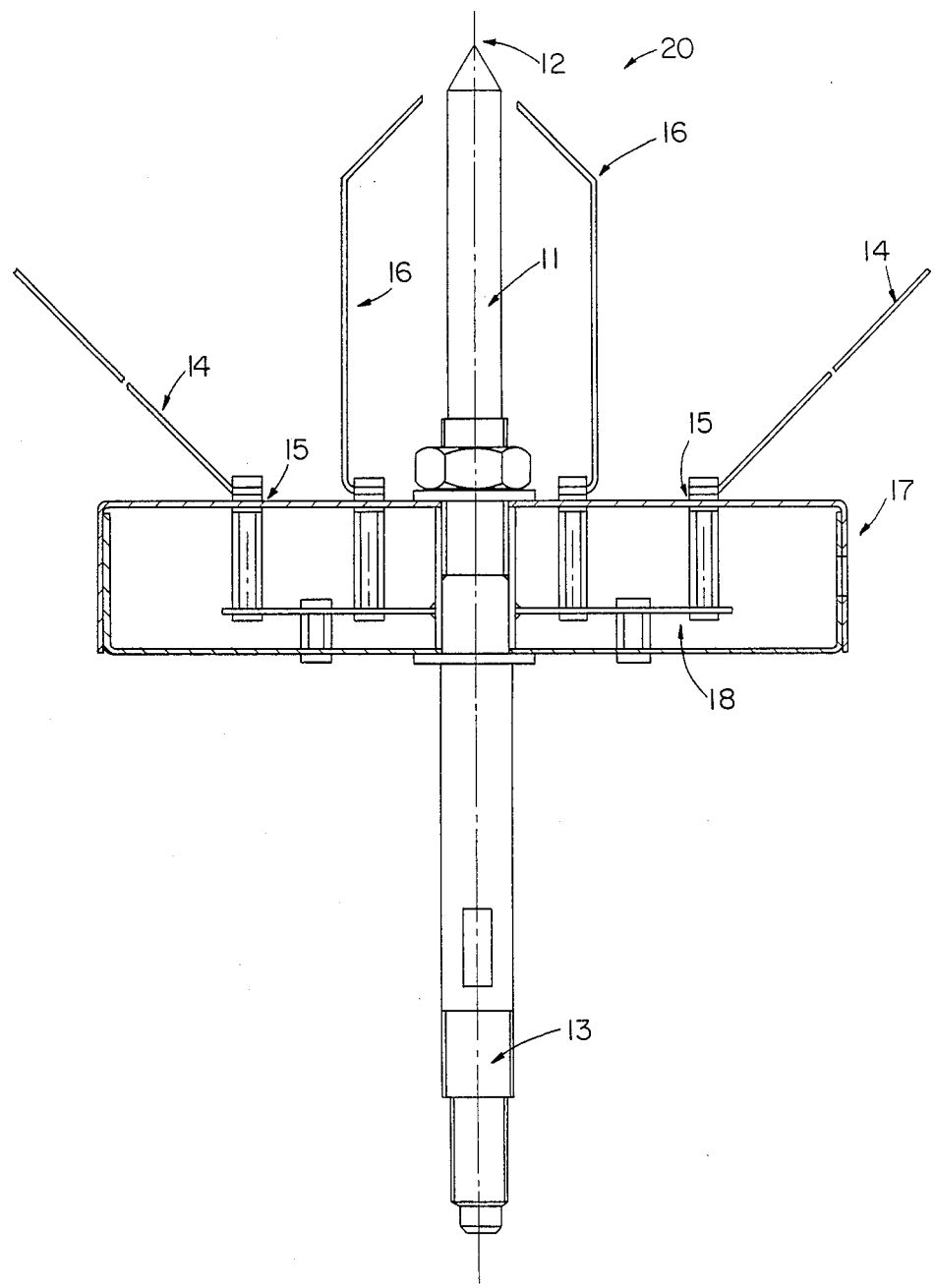
Figure 4:
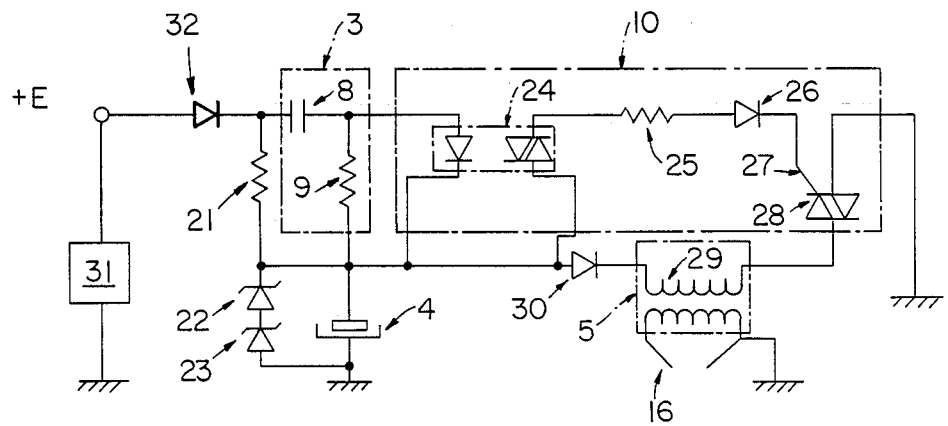
Figure 5:
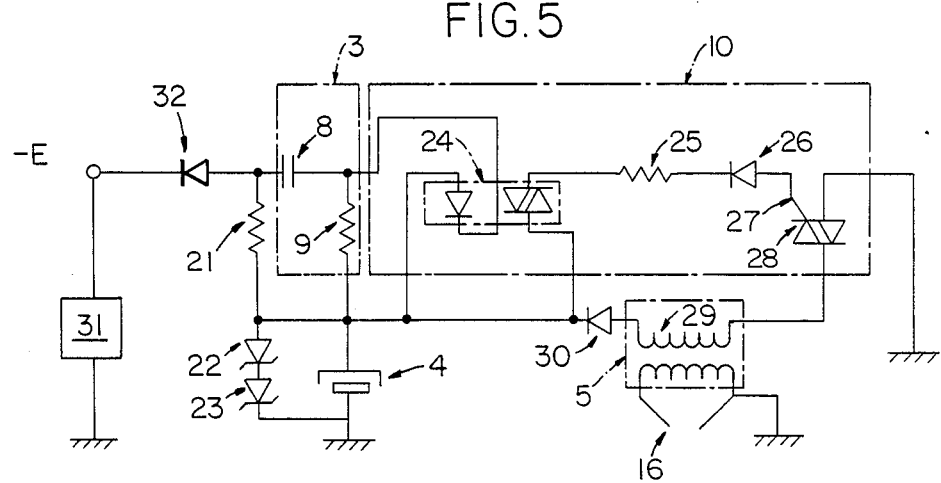

It will be well understood from the following description given by way of non limitative example, with reference to the accompanying drawings which show:

FIG. 1: a form of evolution in time of the voltage collected,

FIG. 2: the block diagram of the circuit and of the components of the means for implementing the method of the invention, FIG. 3: a lightning conductor provided with these means, FIG. 4: a detailed diagram of a particular embodiment applied to protection against so called positive thunderstorms, and FIG. 5: the detailed diagram of the particular embodiment applied to the protection against so called negative thunderstorms.

Referring to the drawings (FIG. 2) means are shown for implementing the method and comprising, in a way known per se, an atmospheric potential tapping member 1.

It is known that, in thundery weather, even before there is a real threat of the lightning striking, the atmospheric field becomes sufficient for there to be, at least in certain zones, release of the electric charges which by impact will ionize the air.

As soon as the air is weakly ionized in the zone where the potential tapping member acts, it collects a voltage $U_c$.

Instead of directly supplying equipment for protection against lightning such as a lightning conductor with the collected voltage $U_c$, in accordance with an essential characteristic of the method of the invention, at least one capacitor 4 is charged whose discharge circuit, as discussed further on, will only feed the equipment protecting against lightning subsequently with power.

Obviously, this member 1 is preferably placed in a zone where, by any known means, ionization of the air is promoted, such as a zone adjacent a conducting piece 12 or 20 situated at a certain height from the ground and connected to ground so that, by tip effect, the atmospheric field is concentrated about this point and this anticipates the emission of electric charges.

Before there is a real threat of lightning striking, this collected voltage $U_c$ evolves in a variable manner depending on the thunderstorms, but nevertheless remains within a range of relatively low voltages called low range $U_b$. It is because of this variable evolution that the curve has in fact only been symbolized (see broken lines).

It is only a few tens of microseconds before there is a real threat of the lightning striking a given place that the atmospheric field at this place undergoes a sudden increase which will therefore be reflected in the collected voltage $U_c$. This will then rise up to a range of voltages $U_h$ greater than that $U_b$ where it was situated up to then with a potential gradient (dv/dt) detected with respect to time which will be very high.

According to another essential characteristic of the invention, in the upper range $U_h$ of voltages the evolution with respect to time of the potential detected is monitored and as soon as the gradient rises beyond a predetermined threshold, capacity 4 is caused to discharge into the circuit supplying the lightning protection equipment with power.

At the terminals of the capacitor, the voltage increases progressively towards the threshold voltage at which it is stabilized, up to the moment when crossing of said threshold is detected, it will bedropped by discharge ready to rise again.

In the application to lightning conductors, this discharge of the capacitor is in the form of an electric discharge at its tip so as to ensure, by an intense emission of electric charges, ionization of the air and anticipation of the beginning of the corona effect.

Preferably in combination with a means 12, 20 of a kind for promoting ionization of the air, such as a tip 12, 20 connected to the ground and creating thereabout a concentration of the atmospheric field, the means for implementing this method comprise (FIGS. 2 and 3) at least one atmospheric potential tapping member (1, 14) preferably in the atmospheric field reigning in the vicinity of said means 12, 20 of a kind for promoting ionization of the air.

They are characterized in that, connected to this potential tapping member 1, they comprise at least one circuit with:

on the one hand, a detector 3 detecting the cross over of the predetermined threshold for the potential gradient (dv/dt) detected with respect to time "t" and, on the other hand, at least one capacitor 4 whose discharge circuit is placed, through a control circuit 10, under the control of detector 3, connected to the equipment for protection against lightning.

Upstream of capacitor 4, we find advantageously a threshold circuit 6 selecting the voltages of the lower range $U_b$.

Similarly, upstream of detector 3, a threshold circuit 2 will be found selecting the voltages of the upper range $U_h$.

In the case where the means comprise several capacitors, they are obviously connected in parallel so as to add their capacity.

It can be seen that the first of the originalities of these means for implementing the method resides in the fact that a truly independent source of energy is available during thundery weather, formed by the capacity, a veritable reservoir which is charged and discharged while releasing all its energy just at the time then there is a very considerable risk, that is to say just before a "precurser" risks looping the discharge circuit for the lightning.

It is further known that thunderstorms may, depending on the respective polarities of the clouds and of the ground, be a positive or negative type.

So that, in its commercial version, the protection equipment takes into account these two types of thunderstorms, within the limits of course where components of the circuits such as diodes have a connection direction which depends on this polarity, the means of the invention may advantageously comprise at least one assembly of two similar circuits, for example juxtaposed and/or superimposed, one of them being adapted for so called negative thunderstorms, the other being adapted for so called positive thunderstorms.

It goes without saying that the means may be formed either of a single circuit or of an assembly of combined circuits (positive and negative thunderstorms) or of several circuits or of assemblies of circuits, for example, calibrated differently so as to provide stepped tripping.

In actual fact, two assemblies may be sufficient calibrated with respect to each other with different time constants so as to provide the maximum of efficiency should two lightning discharges exceptionally very close to each other appear in the same places.

On the electronic card will be further provided all the useful protections known to a man skilled in the art for ensuring the correct permanent operation of each of the components.

In the application to lightning conductors, tip 20 concentrating the field and promoting ionization of the air in the potential tapping zone may, of course, be formed by the tip 12 of the lightning conductor provided of course that it is connected to the ground. In this case, the power supply circuit 5 will be connected to at least one electrode 16 forming with tip 12 an intense electric discharge generator.

In the case where the power supply circuit 5 is connected directly to the tip 12 of the lightning conductor this latter then being isolated from the ground for voltages lower than that of the lightning, it is necessary for the tip 20 of the circuit then to be formed by a separate part of the tip 12 of the lightning conductor.

Since the charge and discharge cycle of the capacity is automatically repetitive, it goes without saying that another feature of the means of the invention resides in the fact that it is possible to control the electron discharge in a very short lapse of time and with remarkable accuracy calibrated in the laboratory.

Since the components are static, the advantages related to reliability, availability, safety and maintenance are obvious.

In its version with at least one electrode, this lightning conductor will be formed as a whole, for example, by a rod 11 ending in a tip 12 and connected to the ground by a connection 13 and at least one potential tapping 14 carefully isolated from the tip by insulators 15, of any known type, chosen for their dielectric quality and their perfect resistance in time to atmospheric agents and to luminescent agents (ultra violet rays).

At least one spark electrode 16 is disposed close to tip 12 and is fixed, like the potential taps 14, in a way isolating it with respect to tip 12.

These electrodes 16 may, for this, be disposed on an insulating support which will have the further advantage of fixing the distance between tip 12 and the electrode 16 in a perfectly constant way.

The potential tapping members 14 and electrodes 16 are, through their insulating means, supported by protective casing 17 which is fitted over tip 12 and which contains the card 18 with the printed or wired circuit and the electronic components.

The protective casing 17 will preferably be made from an unoxidizable metal perfectly sealed to bad weather, with possibly a surface treatment such as nickel coating, so as to offer the components the maximum protection against induced currents due to the passage of the lightning or capacitive effects.

The protective casing 17 alone forms an excellent protection of the "Faraday cage" type; it is nevertheless possible to have a casing made from a plastic material or from composite materials having all the advantages of the metal version.

In the commercial version, card 18 and the electric components will be embedded in a resin chosen for its dielectric qualities and for its excellent resistance to shock waves.

The resin will furthermore be insensitive to the atmospheric parameters of the humidity type so as to provide sealed operation of the assembly;

It will have the further advantage of preserving all the qualities of the device in time (good resistance to ageing).

Besides their use in combination with a lightning conductor, these means may be advantageously used in equipment relative, for example, to the safety of installations, particularly electrical installations, and in very different forms. It is for example possible to apply these means for supplying equipment which, in thundery weather, provide preventive load shedding of important installations.

In a preferred embodiment (FIGS. 4 and 5), the voltage $U_c$ taken at the output of diode 32 (for example of type 1N4004) passes through a resistor 21 (for example of 750 ohms/3 watts) before charging the capacitor 4 (for example of 10 micro farads/400 volts) up to a threshold (for example 300 volts) determined by the Zener diodes 22, 23.

The detector 3 detecting overshooting of a predetermined threshold for the potential gradient (dv/dt) detected with respect to time consists for example, of a high pass filter formed of a shunt connected RC circuit.

A man skilled in the art knows how to determine the respective values of resistor 9 and capacitor 8 so that the detector reacts with a given time constant and may thus be calibrated within 10 microseconds or so.

In the case of overshooting, detector 3 transmits a signal to the device 10 controlling the discharge of capacitor 4.

The control device 10 advantageously comprises an optocoupler 24 (for example of the MOC 3020 type) which outputs, through a resistor 25 (for example of 22 Kilo ohms) a pulse controlling the gate 27 of a triac 28 (for example 8 Ampere/400 volts).

The triac is then enabled and releases all the energy accumulated in capacity 4 to the power supply circuit 5 for example through a transformer 29.

A diode 26 (for example of type 1N4004) placed upstream of gate 27 of the triac will then protect this latter from the overvoltages due to the self inductance.

Between capacitor 4 and the transformer 29 the circuit will pass similarly through a similar diode 30 avoiding oscillation between the transformer and the capacity.

Furthermore, the device comprises a device 31 for protection against overvoltages (such as a protective device UE350Q) which protects the components and the circuit against voltage rises (in this example beyond 350 volts).

The components and circuits shown in FIGS. 4 and 5 are identical, only the diodes being connected differently so as to take account of positive (FIG. 4) and negative (FIG. 5) thunderstorms.

We claim:

1. An electronic method for protection against lightning, comprising:
   providing a storage capacitor and a discharge circuit for supplying voltage from the capacitor to a discharge electrode, and providing an atmospheric potential tapping member to collect a voltage $U_c$;
   charging the capacitor with the collected voltage $U_c$; while the collected voltage $U_c$ remains in a lower range $U_b$, charging the capacitor with the collected voltage $U_c$; and
   monitoring a gradient dv/dt of collected voltage $U_c$ and
   detecting a rate of change of the gradient dv/dt of collected voltage $U_c$ in excess of a predetermined threshold when the collected voltage $U_c$ rises to an upper range $U_h$, and causing the capacitor to be discharged through the discharge circuit to a discharge electrode.

2. Electronic apparatus for protecting against lightning, comprising:
   means for promoting ionization of air by concentrating an atmospheric electric field, said means for promoting ionization being grounded at least for lightning voltages;
   an atmospheric potential tapping member for collecting a voltage $U_c$;
   a storage cpaacitor connected to said atmospheric potential tapping member so as to be charged from the collected voltage $U_c$ while the collected voltage $U_c$ remains in a lower range $U_c$;
   a discharge electrode;
   a control circuit for discharging said capacitor through a discharge circuit to said discharge electrode; and
   a detector circuit for detecting a rate of change dv/dt of collected voltage $U_c$ in excess of a predetermined threshold when the collected voltage $U_c$ has risen to an upper range $U_h$, said detector circuit being connected to said control circuit for causing discharge of said capacitor.

3. Apparatus in accordance with claim 2, wherein said means for promoting ionization of air comprises a tip connected to ground.

4. Apparatus in accordance with claim 2, wherein said atmospheric potential tapping member is situated in an atmospheric electric field in the vicinity of said means for promoting ionization of air.

5. Apparatus in accordance with claim 2, which comprises a device connected between said atmospheric potential tapping member and said capacitor for selecting voltage in the lower range $U_b$.

6. Apparatus in accordance with claim 5, which comprises a device connected between said atmospheric potential tapping member and said detector circuit for selecting voltages in the upper range $U_h$.

7. Apparatus in accordance with claim 2, which comprises a device connected between said atmospheric potential tapping member and said detector circuit for selecting voltages in the upper range $U_h$.

8. Apparatus in accordance with claim 7, wherein said detector circuit comprises a high pass filter in the form of a resistor-capacitor circuit with the resistor connected in shunt.

9. Apparatus in accordance with claim 2, wherein said detector circuit comprises a high pass filter in the form of a resistor-capacitor circuit with the resistor connected in shunt.

10. Apparatus in accordance with claim 9, wherein said control circuit comprises an optocoupler having an input connected to an output of said detector circuit.

11. Apparatus in accordance with claim 10, wherein said control circuit comprises a triac in said discharge circuit, said triac having an input gate connected to an output of said optocoupler.

12. Apparatus in accordance with claim 2, wherein said control circuit comprises an optocoupler having an input connected to an output of said detector circuit.

13. Apparatus in accordance with claim 12, wherein said control circuit comprises a triac in said discharge circuit, said triac having an input gate connected to an output of said optocoupler.

14. Apparatus in accordance with claim 2, which comprises two similar circuits, one having elements polarized for negative thunderstorms and the other having elements polarized for positive thunderstorms.

15. Apparatus in accordance with claim 2, which comprises two similar circuits having components calibrated with different time constants so as to provide tripping by stages.

16. Equipment for protection against lightning comprising:

a rod ending in a tip and connected to ground, said top serving to promote ionization of air by concentrating on atmospheric electric field gradient;

an atmospheric potential tapping member for collecting a voltage $U_c$, and insulators isolating said atmospheric potential tapping member from said tip;

at least one spark electrode disposed close to said tip and fixed so as to be electrically insulated from said tip;

a circuit card supporting:

a storage capacitor connected to said atmospheric potential tapping member so as to be charged from the collected voltage $U_c$ while the collected voltage $U_c$ remains in a lower range $U_b$, a control circuit for discharging said capacitor through a discharge circuit to said spark electrode, and a detector circuit for detecting a rate of change $dv/dt$ of collected voltage $U_c$ in excess of a predetermined threshold when the collected voltage $U_c$ has risen to an upper range $U_h$, said detector circuit being connected to said control circuit for causing discharge of said capacitor; and a protective casing for said circuit card.

* * * * *

UNITED STATES PATENT AND TRADEMARK OFFICE
CERTIFICATE OF CORRECTION

PATENT NO. : 4,752,854

DATED : June 21, 1988

INVENTOR(S) : Lefort et al

It is certified that error appears in the above-identified patent and that said Letters Patent is hereby corrected as shown below:

Claim 1, Column 7, Lines 67 and 68 "charging the capacitor with the collective voltage $U_c$;" is a duplication.

Claim 1, Column 8, Line 3, "detectinga" to --detecting a--.

Claim 2, Column 8, Line 17 "cpaacitor" to --capacitor--.

Claim 2, Column 8, Line 21 "lower range $U_c$" to --lower range $U_b$--.

Claim 5, Column 8, Line 42, "voltage" to --voltages--.

Signed and Sealed this

Twenty-ninth Day of January, 1991

*Attest:*

HARRY F. MANBECK, JR.

*Attesting Officer*     *Commissioner of Patents and Trademarks*